(12) United States Patent
Wang et al.

(10) Patent No.: US 9,843,239 B2
(45) Date of Patent: Dec. 12, 2017

(54) FARM ANIMAL-OPERATED CONVEYER AND GENERATOR

(71) Applicants: Zhenkun Wang, Ashburn, VA (US); Shiyuan Song, Ashburn, VA (US)

(72) Inventors: Zhenkun Wang, Ashburn, VA (US); Shiyuan Song, Ashburn, VA (US)

(*) Notice: Subject to any disclaimer, the term of this patent is extended or adjusted under 35 U.S.C. 154(b) by 9 days.

(21) Appl. No.: 15/149,762

(22) Filed: May 9, 2016

(65) Prior Publication Data
US 2017/0070123 A1 Mar. 9, 2017

(30) Foreign Application Priority Data
Sep. 7, 2015 (CN) .................. 2015 2 0685705 U

(51) Int. Cl.
| | | |
|---|---|---|
| *F02B 63/04* | (2006.01) | |
| *F03G 7/08* | (2006.01) | |
| *H02K 7/18* | (2006.01) | |
| *A01K 15/02* | (2006.01) | |
| *B65G 15/28* | (2006.01) | |
| *B65G 23/00* | (2006.01) | |
| *F03G 5/02* | (2006.01) | |
| *F03G 5/04* | (2006.01) | |
| *A63B 22/06* | (2006.01) | |
| *F03G 5/00* | (2006.01) | |

(52) U.S. Cl.
CPC ......... *H02K 7/1861* (2013.01); *A01K 15/028* (2013.01); *B65G 15/28* (2013.01); *B65G 23/00* (2013.01); *F03G 5/025* (2013.01); *F03G 5/047* (2013.01)

(58) Field of Classification Search
USPC ................................ 290/1 R; 482/57; 185/15
See application file for complete search history.

(56) References Cited

U.S. PATENT DOCUMENTS

| | | | | |
|---|---|---|---|---|
| 1,788 | A * | 9/1840 | Hibbard | F03G 5/00 185/15 |
| 78,808 | A * | 6/1868 | King | F03G 5/00 185/15 |
| 174,948 | A * | 3/1876 | Cushing | F03G 5/00 185/15 |
| 208,413 | A * | 9/1878 | Miller | E21B 19/008 185/15 |
| 244,799 | A * | 7/1881 | Dye | F04B 27/0878 185/15 |
| 247,354 | A * | 9/1881 | Howe | E21B 19/008 185/15 |
| 254,665 | A * | 3/1882 | Leinbrock | A63B 22/0023 185/16 |

(Continued)

*Primary Examiner* — Pedro J Cuevas
(74) *Attorney, Agent, or Firm* — WPAT, PC

(57) ABSTRACT

The present invention provides a farm animal-operated conveyor and generator apparatus and a method for powering thereof, wherein the apparatus comprises a generator, a generator drive belt, a drive roller, a conveyor belt, a drive drum, a central bearing post, a drive gear, electromagnetic yokes, an intermediate gear, a pinion gear, a beveled gear, conveyor chassis, and a secondary intermediate gear. The electromagnetic yoke automatically collars a farm animal, which in turn rotates the drive gear and drives the conveyer belt and the generator. The movement of the farm animal powers the conveyer belt for transporting farm products, and drives the generator to generate electricity.

17 Claims, 6 Drawing Sheets

(56) References Cited

U.S. PATENT DOCUMENTS

| | | | | |
|---|---|---|---|---|
| 365,436 | A * | 6/1887 | Griffin | F03G 5/00 185/15 |
| 368,825 | A * | 8/1887 | Getchell | B61C 11/005 105/26.05 |
| 3,663,016 | A * | 5/1972 | Morris | A63G 9/00 472/125 |
| 4,428,576 | A * | 1/1984 | Fisher, Jr. | A63G 1/12 472/22 |
| 5,358,461 | A * | 10/1994 | Bailey, Jr. | A63B 21/0053 290/1 R |
| 5,378,214 | A * | 1/1995 | Kreitenberg | A63B 21/0125 472/21 |
| 5,616,104 | A * | 4/1997 | Mulenburg | A63B 21/0054 472/21 |
| 5,992,553 | A * | 11/1999 | Morrison | B62M 6/45 180/206.2 |
| 6,281,594 | B1 * | 8/2001 | Sarich | A43B 3/00 290/1 A |
| 6,291,900 | B1 * | 9/2001 | Tiemann | H02P 9/04 290/1 A |
| 6,744,145 | B2 * | 6/2004 | Chang | A43B 3/0005 219/211 |
| 6,910,992 | B2 * | 6/2005 | Arguilez | A63B 21/285 482/57 |
| 7,304,398 | B1 * | 12/2007 | Kim | F03G 7/00 290/1 E |
| 7,402,915 | B2 * | 7/2008 | Hutchinson | H02K 7/1853 290/1 A |
| 7,652,386 | B2 * | 1/2010 | Donelan | F03G 5/00 290/1 R |
| 7,659,636 | B2 * | 2/2010 | Donelan | F03G 5/00 290/1 C |
| 7,729,767 | B2 * | 6/2010 | Baker, III | A61N 1/3785 607/35 |
| 8,062,237 | B2 * | 11/2011 | Rastegar | A61H 3/00 482/51 |
| 8,217,523 | B2 * | 7/2012 | Brown | F03G 5/06 290/1 R |
| 8,235,869 | B2 * | 8/2012 | Rastegar | A61H 3/00 310/345 |
| 8,299,634 | B2 * | 10/2012 | Donelan | F03G 5/00 290/1 C |
| 8,487,456 | B2 * | 7/2013 | Donelan | F03G 5/00 290/1 C |
| 8,970,054 | B2 * | 3/2015 | Stanton | H02K 7/1853 290/1 C |
| 9,057,361 | B2 * | 6/2015 | Donelan | F03G 5/00 |
| 9,190,886 | B2 * | 11/2015 | Stanton | H02K 7/1861 |
| 9,362,803 | B2 * | 6/2016 | Panousis | H02K 7/1853 |
| 9,407,125 | B2 * | 8/2016 | Shepertycky | H02K 7/1861 |
| 9,692,276 | B2 * | 6/2017 | Oteman | H02K 7/1853 |
| 2004/0072657 | A1 * | 4/2004 | Arguilez | A63B 21/285 482/61 |
| 2004/0183306 | A1 * | 9/2004 | Rome | A45F 3/08 290/1 R |
| 2005/0161289 | A1 * | 7/2005 | Gomez-Nacer | F03G 5/047 185/15 |
| 2006/0046907 | A1 * | 3/2006 | Rastegar | A61H 3/00 482/91 |
| 2007/0233279 | A1 * | 10/2007 | Kazerooni | A61F 2/68 623/24 |
| 2008/0277943 | A1 * | 11/2008 | Donelan | F03G 5/00 290/1 R |
| 2008/0278028 | A1 * | 11/2008 | Donelan | F03G 5/00 310/300 |
| 2010/0276944 | A1 * | 11/2010 | Donelan | F03G 5/00 290/1 R |
| 2013/0038056 | A1 * | 2/2013 | Donelan | F03G 5/00 290/7 |
| 2014/0152008 | A1 * | 6/2014 | Donelan | F03G 5/00 290/7 |
| 2015/0207384 | A1 * | 7/2015 | Panousis | H02K 7/1853 290/1 C |

* cited by examiner

FARM ANIMAL-OPERATED CONVEYER AND GENERATOR

CROSS REFERENCE TO RELATED APPLICATION

This application claims priority to Chinese Patent Application No. 201520685705.1 filed in the Chinese Patent Office on Sep. 7, 2015, the entire content of which is incorporated herein by reference.

BACKGROUND OF THE INVENTION

Much of the equipment used in farming requires electricity or power to operate, which can prove to be a problem for smaller, more remote farms that may not have access to an electrical grid and must generate electricity on the farm itself. Traditionally, these farms rely on power from hydroelectric, wind, or solar sources.

Also important in farming is transporting fruits, vegetables, or other agricultural products, which requires transportation equipment such as motor or electric powered vehicles. Some farms use conveyers or other forms of fixed conveyance driven by a motor to transport goods.

Between the power generators and agricultural product transportation, managing energy production and energy usage on farms is of great economic importance. Additionally, managing the pollution and fossil fuel usage of these sources of energy production and consumption also must be considered.

BRIEF SUMMARY OF THE INVENTION

It is an object of the invention to provide a method and apparatus for a farm animal-operated conveyor and generator.

According to an aspect of an embodiment of the invention, a farm animal-operated conveyor and generator apparatus is provided, wherein the apparatus comprises a generator, a generator drive belt, a drive roller, a conveyor belt, a drive drum, a central bearing post, a drive gear, electromagnetic animal yokes, an intermediate gear, a pinion gear, a beveled gear, conveyor chassis, and a secondary intermediate gear.

According to an aspect of an embodiment of the invention, the farm comprises a farm entrance, a generator, grazing pastures, an animal path, animals, cattle, sheep farms, farm land, vegetable gardens, orchards, fish ponds, other farm lands, a conveyer, and a farm management building.

The present invention provides an animal-operated conveyer and generator disposed between a farm management building and the farm lands and grazing areas. The animal areas, such as the sheep pen, cattle pen, or pig pen are configured with a gate that can open and can be positioned to direct the animals in the pens on to a circular animal path. The electromagnetic animal yokes are positioned in the circular animal path, such that any animal entering the circular animal path can be automatically harnessed by the electromagnetic animal yoke.

After the animal has been harnessed by the electromagnetic animal yoke, the movement of the animal will drive the yoke in either a clock-wise or counter-clock-wise direction. The electromagnetic animal yoke rotates around the central bearing post, and the electromagnetic animal yoke is physically coupled to the drive cylinder gear, which in turn drives the intermediate gear, the pinion, and the secondary intermediate gear. The secondary intermediate gear rotates and drives the drive roller, which in turn drives the conveyer. The generator is physically coupled to the drive drum via the generator drive belt, and will convert the rotating kinetic energy of the drive drum to electricity.

The present invention provides the conveyer as connecting the land near the farm management building to the various farm lands, such that the conveyer can be used to move farm goods rapidly across the farm.

The moving animals harnessed by the electromagnetic animal yokes will drive the conveyer as they walk along the farm's circular animal path, and in turn the rotation of the drive drum of the conveyer will drive the generator and generate electricity for the farm. This has the benefit of providing a non-polluting, non-fossil-fuel-based method for farmers to transport goods across their farm lands and generate electricity.

It is to be understood that both the forgoing general description and the following detailed description are exemplary and explanatory and are not restrictive of the invention, as claimed.

BRIEF DESCRIPTION OF THE DRAWINGS

The above embodiments become more readily apparent to those ordinarily skilled in the art after reviewing the following detailed description and accompanying drawings, in which.

DETAILED DESCRIPTION

Aspects, features and advantages of several exemplary embodiments of the present invention will become better understood with regard to the following description in connection with the accompanying drawings. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not" "must," and "must not," are not meant to limit the scope of the present invention as the embodiments disclosed herein are merely exemplary.

Figure 1:
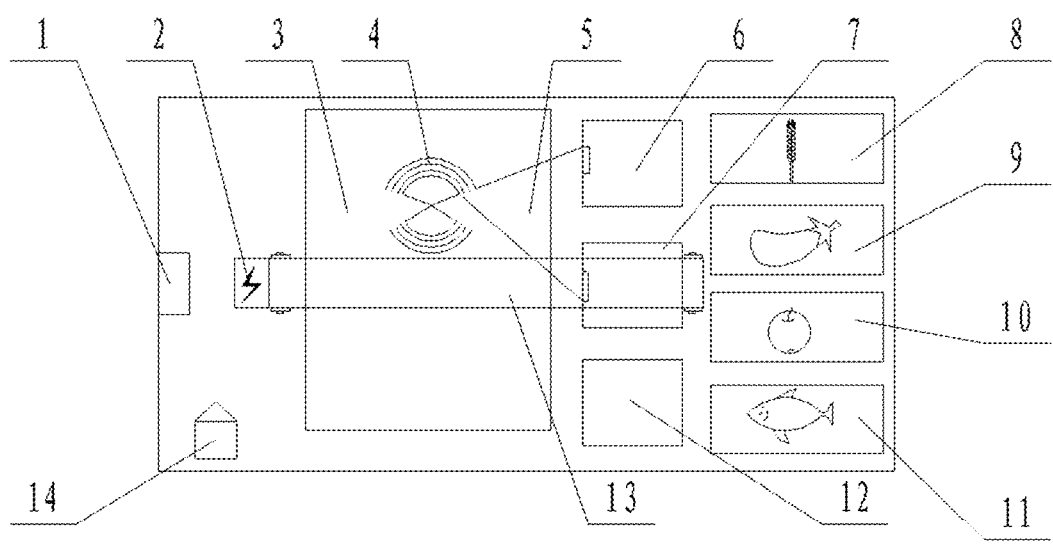
FIG. 1 is a schematic diagram of a farm and the farm animal-operated conveyer and generator apparatus.

FIG. 1 is an exemplary embodiment of a farm with a farm animal-operated conveyer and generator apparatus 13, a grazing pasture 3, a circular animal path 4, an animal pen opening 5, a cattle pen 6, a sheep pen 7, a farm land 8, a vegetable farm 9, a fruit orchard 10, a fish pond 11, a pig pen 12, and a farm management building 14, wherein the farm animal-operated conveyer and generator apparatus comprises a generator 2.

Figure 2:
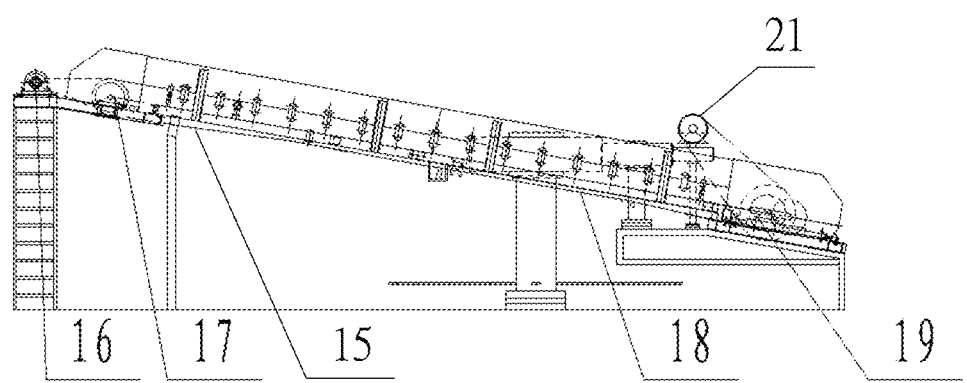
FIG. 2 is a schematic diagram of the farm animal-operated conveyer and generator apparatus.

FIG. 2 is an exemplary embodiment of a farm animal-operated conveyer and generator apparatus, comprising a conveyor chassis 15, a generator 16, a drive drum 17, a conveyer belt 18, a drive roller 19, and a secondary intermediate gear 21.

Figure 3:
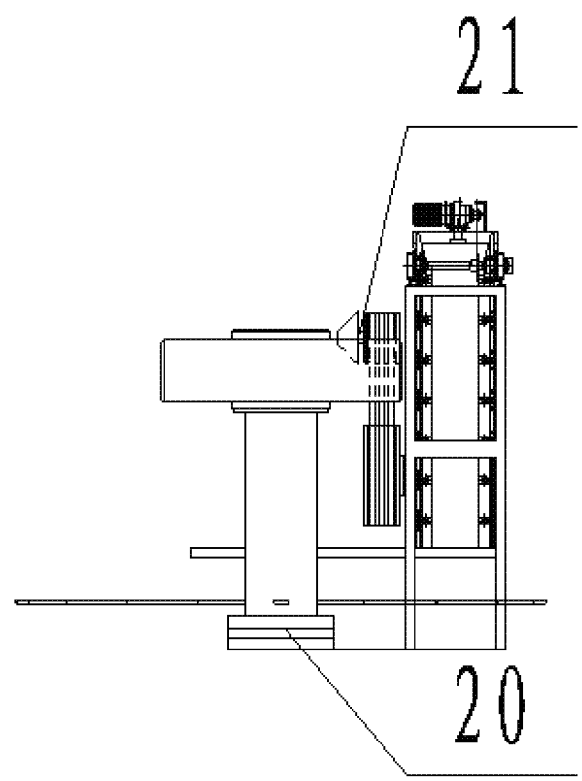
FIG. 3 is a schematic diagram of the farm animal-operated conveyer and generator apparatus from a profile perspective.

FIG. 3 is a profile perspective of an exemplary embodiment of a farm animal-operated conveyer and generator apparatus, comprising the secondary intermediate gear 21, and a central bearing post 20.

Figure 4:
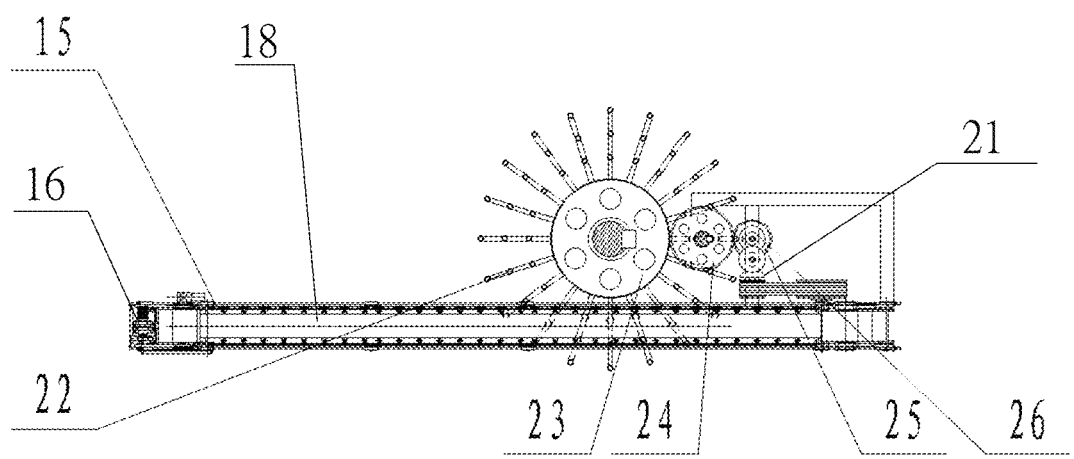
FIG. 4 is a schematic diagram of the farm animal-operated conveyer and generator apparatus from a profile perspective.

FIG. 4 is another profile perspective of an exemplary embodiment of a farm animal-operated conveyer and generator apparatus, comprising the conveyer chassis 15, the generator 16, the conveyer belt 18, the secondary intermediate gear 21, the electromagnetic animal yoke 22, a drive gear 23, an intermediate gear 24, a pinion gear 25, and a beveled gear 26.

As shown in FIG. 1, a farm animal-operated conveyer and generator apparatus 13 is disposed on a farm, and positioned to connect the farm entrance 1 and farm management building 14 to the cattle pen 6, sheep pen 7, farm land 8, vegetable farm 9, fruit orchard 10, fish pond 11, and the pig pen 12. The animal pen opening 5 can be positioned manually or automatically to direct animals into the circular animal path 4 of the grazing pasture 3. The animal pen opening 5 tapers to one side of the circular animal path 4, such that the animals are either moving in a clockwise or counterclockwise direction along the circular animal path 4.

As animals exit the cattle pen 6 or sheep pen 7, the animals are yoked to the electromagnetic animal yoke of the farm animal-operated conveyer and generator apparatus 13. The circumference of the circular animal path 4 is equal to or larger than the electromagnetic animal yoke, such that the animals that are yoked can only move in a direction to rotate the electromagnetic animal yoke of the farm animal-operated conveyer and generator apparatus 13.

As the animals walk around the circular animal path 4 while yoked to electromagnetic animal yoke of the farm animal-operated conveyer and generator apparatus 13, the animals' movement will drive the conveyer belt, and in turn drive the generator 2, which will produce electricity.

As shown in FIG. 2, FIG. 3, and FIG. 4, the farm animal-operated conveyer and generator comprises an electromagnetic animal yoke 22, conveyor chassis 15, a generator 16, a drive drum 17, a conveyer belt 18, a drive roller 19, and a secondary intermediate gear 21, a central bearing post 20, a drive gear 23, an intermediate gear 24, a pinion gear 25, and a beveled gear 26.

The electromagnetic animal yoke 22 is directly coupled to the drive gear 23, such that the rotation speed of the electromagnetic animal yoke 22 is equal to the drive gear 23. As the electromagnetic animal yoke 22 and drive gear 23 rotate, the drive gear 23 engages the intermediate gear 24 and causes the intermediate gear 24 to rotate. The intermediate gear 24 engages the pinion gear 25, which is coupled to the beveled gear 26. The beveled gear 26 is provided to enable different transmission ratios and engage the secondary intermediate gear 21, and transmit the horizontal rotation of the electromagnetic animal yoke 22, drive gear 23, intermediate gear 24, and pinion gear 25 to a vertical rotation of the secondary intermediate gear 21. The electromagnetic animal yoke 22 and drive gear 23 are disposed around a central bearing post 20, wherein the central bearing post 20 is designed to reduce friction. The size of the gears can be configured according to a transmission ratio, and can be configured to adjust the speed of the conveyer belt.

The conveyer belt 18 of the above embodiment is provided to enable farm and agricultural products to be rapidly transported across the farm. Accordingly, the conveyer belt can be reversed, either by manipulating the rotational direction of the intermediate gear 24, pinion gear 25, or beveled gear 26, or by manipulating the rotational direction of the electromagnetic yoke 22 and drive gear 23. The yoked animals can be made to walk in the opposite direction, or more or less gears can be used such that the secondary intermediate gear 21 rotates in the appropriate direction.

The secondary intermediate gear 21 is coupled to the drive roller 19 via a drive belt such that the drive roller 19 physically engages the conveyer belt 18 and initiates the movement of the conveyer belt 18. The movement of the conveyer belt 18 will also rotate the drive drum 17 which is physically engaged by the conveyer belt 18. The drive drum 17 is coupled to the generator 16 by a generator drive belt. The rotation of the drive drum 17 drive the generator 16, which in turn, generates electricity.

According to an exemplary embodiment of the present invention, the electromagnetic animal yoke 22 is configured to automatically collar the animals as they enter the circular animal path. The electromagnetic animal yoke is configured to engage a collar fitted to the animal using electromagnetic force.

According to an exemplary embodiment of the present invention, the conveyer belt 18 may be made of an articulated rubber material. The drive belt and generator drive belt may be made of an articulated rubber material, a metal chain, or other belt materials as known in the art.

According to another embodiment of the present invention, the electromagnetic animal yoke 22 is configured to automatically collar the animals as they enter the circular animal path by physically collaring the animals.

Figure 5:
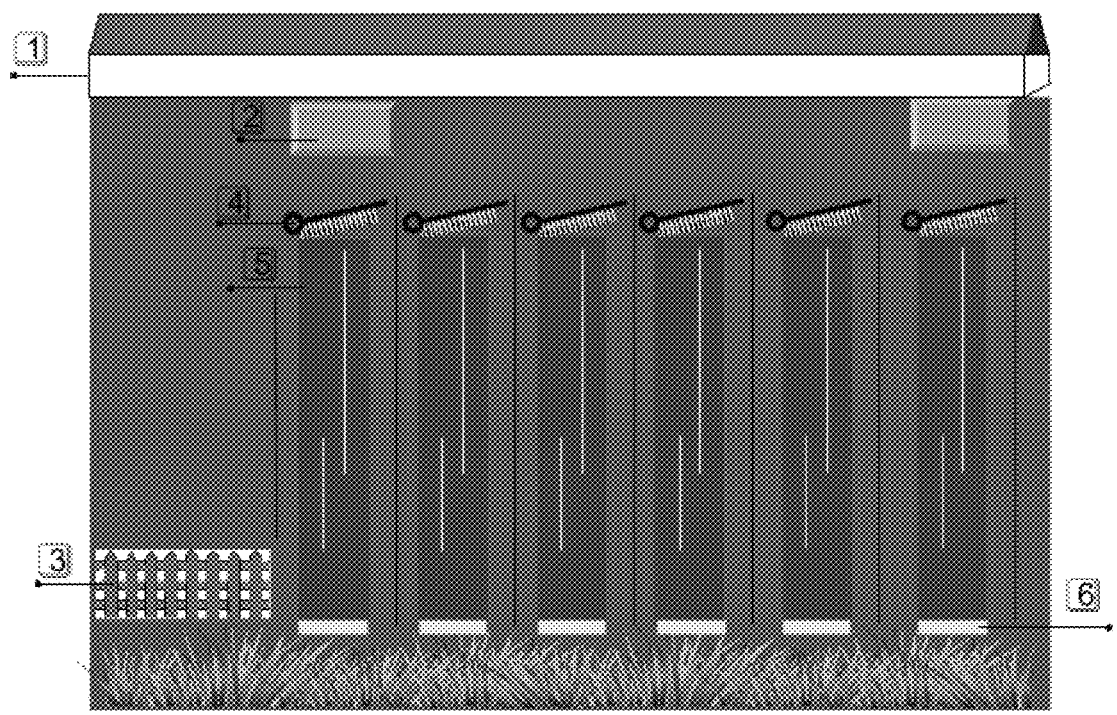
FIG. 5 is a schematic diagram of another embodiment of the farm animal-operated conveyer and generator apparatus.

FIG. 5 shows another embodiment of the present invention. In an embodiment, the conveyer 8 is coupled to the generator 7, and the conveyer 8 has an adjustable slope. When a farm animal steps on the conveyer 8, the conveyer 8 has one side that descends downwards to create an upward slope. At the bottom of the slope of the conveyer 8, a prod is disposed such that farm animals standing on the conveyer 8 will be motivated to walk up the slope away from the prod. As the animal walks up the conveyer 8, the generator 7 is driven to generate power.

Figure 6:
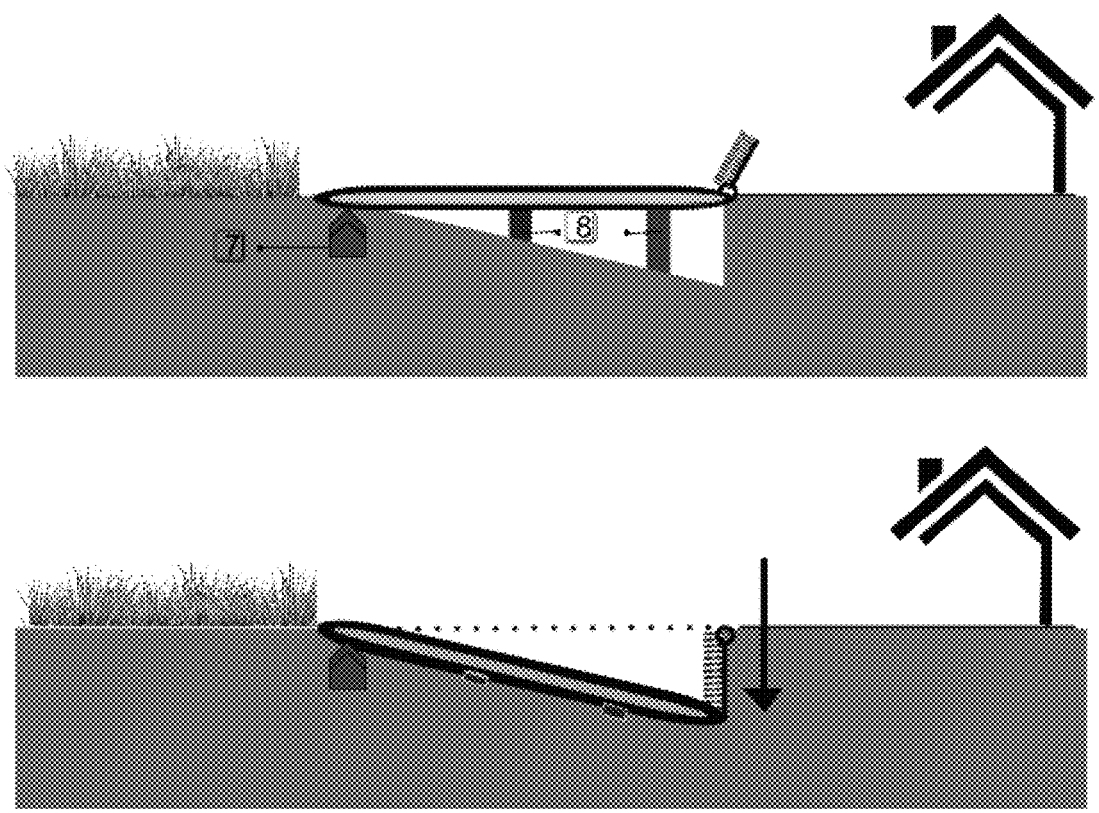
FIG. 6 is a schematic diagram of another embodiment of the farm animal-operated conveyer and generator apparatus.

FIG. 6 shows another embodiment of the present invention. In an embodiment, a farmhouse 1 is provided with a door 2 and a fence 3. The conveyer 5 is provided with a gate 4 and coupled to a generator 6. In an embodiment, there can be multiple conveyers, gates, and generators disposed on the farm, with a fence 3 positioned to prevent farm animals from bypassing the conveyers. The gate 4 comprises prods, and functions similarly to the prods of the conveyer in FIG. 5. A farm animal exits the farm house 1 through the door 2, and enters the conveyer 5. The gate 4 has prods to motivate the farm animal to walk towards the generator 6. As the farm animal walks on the conveyer 5, the generator 6 is driven to generate power.

The foregoing description of the preferred embodiments is presented for purposes of illustration and description. It is not intended to be exhaustive or limit the invention to the precise form of the exemplary embodiments disclosed. Many modifications and variations will be apparent to those of ordinary skill in the art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims.

What is claimed is:

1. A conveyer and generator apparatus operated by from animals, comprising:
    a generator section, comprising a generator;
    a yoke section for coupling a farm animal to the conveyer section, comprising:
        a central drive gear;
        a yoke, configured to rotate about a central bearing post, couple a farm animal to said yoke, and is directly coupled to said central drive gear, wherein said central drive gear and said yoke rotate at a same rotational speed;
        a beveled gear, coupled to said central drive gear; and
        a first intermediate gear, coupled to said beveled gear;
    a conveyer section, coupled to said generator section, comprising:
        a conveyer belt, configured to transport a farm product;
        a conveyer drive drum;
        a conveyer drive belt; and
        a conveyer drive roller, wherein said conveyer belt is disposed around said conveyer drive drum and said conveyer drive roller, and said conveyer drive roller is coupled to said central drive gear by said conveyer drive belt coupled to said first intermediate gear; and
    a generator drive belt, wherein said generator is coupled to said conveyer drive drum by said generator drive belt, wherein said generator converts a rotation of said drive drum and said generator drive belt to electricity;
    wherein, said farm animal moves and drives said conveyer section, and said generator section converts a rotation of said conveyer section to electricity; and
    wherein, said conveyer drive roller rotates and drives said conveyer belt to rotate, said conveyer belt rotates said conveyer drive drum, said conveyer drive belt is disposed around said first intermediate gear and said conveyer drive roller, said conveyer drive belt rotates as said first intermediate gear and said conveyer drive roller rotates, said beveled gear is coupled to said central drive gear to convert a first rotation direction of said central drive gear to a second rotation direction of said first intermediate gear, and said yoke rotates corresponding to a movement of said farm animal.

2. The apparatus of claim 1, further comprising a second intermediate gear coupled between said central drive gear and said beveled gear, wherein said second intermediate gear is sized to set a transmission ratio, and said conveyer belt has a speed according to said transmission ratio.

3. The apparatus of claim 1, further comprising a conveyer chassis, configured to house said conveyer belt, said conveyer drive drum, said conveyer drive roller, and said generator.

4. The apparatus of claim 1, wherein said yoke is an electromagnetic yoke and automatically collars said farm animal using an electromagnetic force applied to a magnetic collar on said farm animal.

5. The apparatus of claim 1, wherein said first rotation direction can be reversed by using a third intermediate gear coupled to said central drive gear and said beveled gear, or by reversing said movement of said farm animal.

6. The apparatus of claim 1, wherein said conveyer drive belt and generator drive belt are composed of either an articulated rubber material or a chain.

7. The apparatus of claim 1, wherein said conveyer belt is made of rubber.

8. The apparatus of claim 1, further comprising:
    said conveyer section, further comprising:
        a conveyer belt; and
        an animal prod;
    wherein, when said farm animal steps onto said conveyer belt, said conveyer section inclines at a slope and extends an animal prod at a bottom of said slope to motivate said farm animal to walk up said slope towards said generator section and drive said conveyer section.

9. The apparatus of claim 1, further comprising:
    a second conveyer section;
    a second generator section, coupled to said second conveyer section;
    wherein, a second farm animal moves and drives said second conveyer section and said second generator section converts a rotation of said second conveyer section to electricity.

10. A method of powering a farm animal-operated conveyer and generator apparatus, the method comprising:
    providing a yoke, configured to rotate about a central bearing post;
    coupling a farm animal to said yoke;
    providing a conveyer belt, configured to transport a farm product and coupled to said yoke, wherein a movement of said farm animal drives said conveyer belt; and
    providing a generator, configured to generate electricity according to a movement of said conveyer belt and coupled to said conveyer belt.

11. The method of claim 10, further comprising:
    providing a central drive gear, physically coupled to said yoke, wherein said central drive gear and said yoke rotate at a same rotational speed;
    providing a beveled gear, coupled to said central drive gear;
    providing a first intermediate gear, coupled to said beveled gear;
    providing a conveyer drive drum;
    providing a conveyer drive roller;
    providing a conveyer drive belt, coupled to said conveyer drive roller and said first intermediate gear;
    configuring said conveyer belt to be disposed around the conveyer drive drum and said conveyer drive roller, wherein said conveyer drive roller is coupled to said central drive gear by said conveyer drive belt;
    providing a generator drive belt, wherein said generator is coupled to said conveyer drive drum by said generator drive belt, wherein said generator converts a rotation of said drive drum and said generator drive belt to electricity;
    directing said farm animal to enter a circular path and automatically coupling said farm animal to said yoke, wherein said yoke is disposed in said circular path;

driving said yoke to rotate using a movement of said farm animal; and driving said conveyer drive roller and said conveyer belt to rotate, wherein said conveyer belt rotates said conveyer drive drum, said conveyer drive belt is disposed around said first intermediate gear and said conveyer drive roller, said conveyer drive belt rotates as said first intermediate gear and said conveyer drive roller rotates, and said beveled gear converts a first rotation direction of said central drive gear to a second rotation direction of said first intermediate gear.

12. The method of claim 10, wherein said yoke is an electromagnetic yoke and automatically collars said farm animal using an electromagnetic force applied to a magnetic collar on said farm animal.

13. The method of claim 10, wherein said conveyer belt is made of rubber.

14. The method of claim 11, further comprising:
providing a conveyer chassis, configured to house said conveyer belt, said conveyer drive drum, said conveyer drive roller, and said generator.

15. The method of claim 11, wherein said first rotation direction can be reversed by using a third intermediate gear coupled to said central drive gear and said beveled gear, or by reversing said movement of said farm animal.

16. The method of claim 11, wherein said conveyer drive belt and generator drive belt are composed of either an articulated rubber material or a chain.

17. The method of claim 11, wherein a second intermediate gear is coupled between said central drive gear and said beveled gear, wherein said second intermediate gear is sized to set a transmission ratio, and said conveyer belt has a speed according to said transmission ratio.

* * * * *